(12) United States Patent
Oikawa

(10) Patent No.: US 10,583,816 B2
(45) Date of Patent: Mar. 10, 2020

(54) LANE DEPARTURE PREVENTION DEVICE

(71) Applicant: TOYOTA JIDOSHA KABUSHIKI KAISHA, Toyota-shi, Aichi (JP)

(72) Inventor: Yoshitaka Oikawa, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 241 days.

(21) Appl. No.: 15/604,824

(22) Filed: May 25, 2017

(65) Prior Publication Data

US 2018/0001876 A1 Jan. 4, 2018

(30) Foreign Application Priority Data

Jun. 30, 2016 (JP) .................. 2016-130344

(51) Int. Cl.
*B60T 8/1755* (2006.01)
*B60T 7/12* (2006.01)
*B60T 7/22* (2006.01)

(52) U.S. Cl.
CPC ............ *B60T 8/17557* (2013.01); *B60T 7/12* (2013.01); *B60T 7/22* (2013.01); *B60T 2201/08* (2013.01); *B60T 2201/083* (2013.01); *B60T 2210/36* (2013.01)

(58) Field of Classification Search
CPC .......... B60T 8/17557; B60T 7/12; B60T 7/22; B60T 2201/08; B60T 2201/083; B60T 2210/36
USPC ........................................................... 701/41
See application file for complete search history.

(56) References Cited

U.S. PATENT DOCUMENTS

| | | | |
|---|---|---|---|
| 2003/0116373 A1* | 6/2003 | Miller | B60T 7/22 180/167 |
| 2005/0246101 A1 | 11/2005 | Courtenay et al. | |
| 2010/0168998 A1* | 7/2010 | Matsunaga | B60W 30/10 701/532 |
| 2010/0235035 A1 | 9/2010 | Nishira et al. | |
| 2011/0015850 A1 | 1/2011 | Tange et al. | |
| 2012/0323473 A1 | 12/2012 | Irie et al. | |

FOREIGN PATENT DOCUMENTS

| | | |
|---|---|---|
| JP | 04-133825 A | 5/1992 |
| JP | 2006-282168 A | 10/2006 |

* cited by examiner

*Primary Examiner* — Paula L Schneider
(74) *Attorney, Agent, or Firm* — Sughrue Mion, PLLC

(57) ABSTRACT

A lane departure prevention device includes: a travelling state recognition unit; a lane line recognition unit; a departure determination unit; a yaw moment calculation unit configured to calculate a target trajectory and a target yaw moment; a direction determination unit configured to determine the departure avoidance direction; a direction alignment determination unit configured to determine the turning direction of the vehicle by the target yaw moment coincides with the departure avoidance direction; and a braking force control unit configured to control the braking forces of the vehicle. In a case where the direction alignment determination unit determines that the results of determinations coincide with each other, the braking force control unit perform a braking force control, and in a case where the direction alignment determination unit doesn't determine that the results of determinations coincide with each other, the braking force control unit doesn't perform the braking force control.

6 Claims, 4 Drawing Sheets

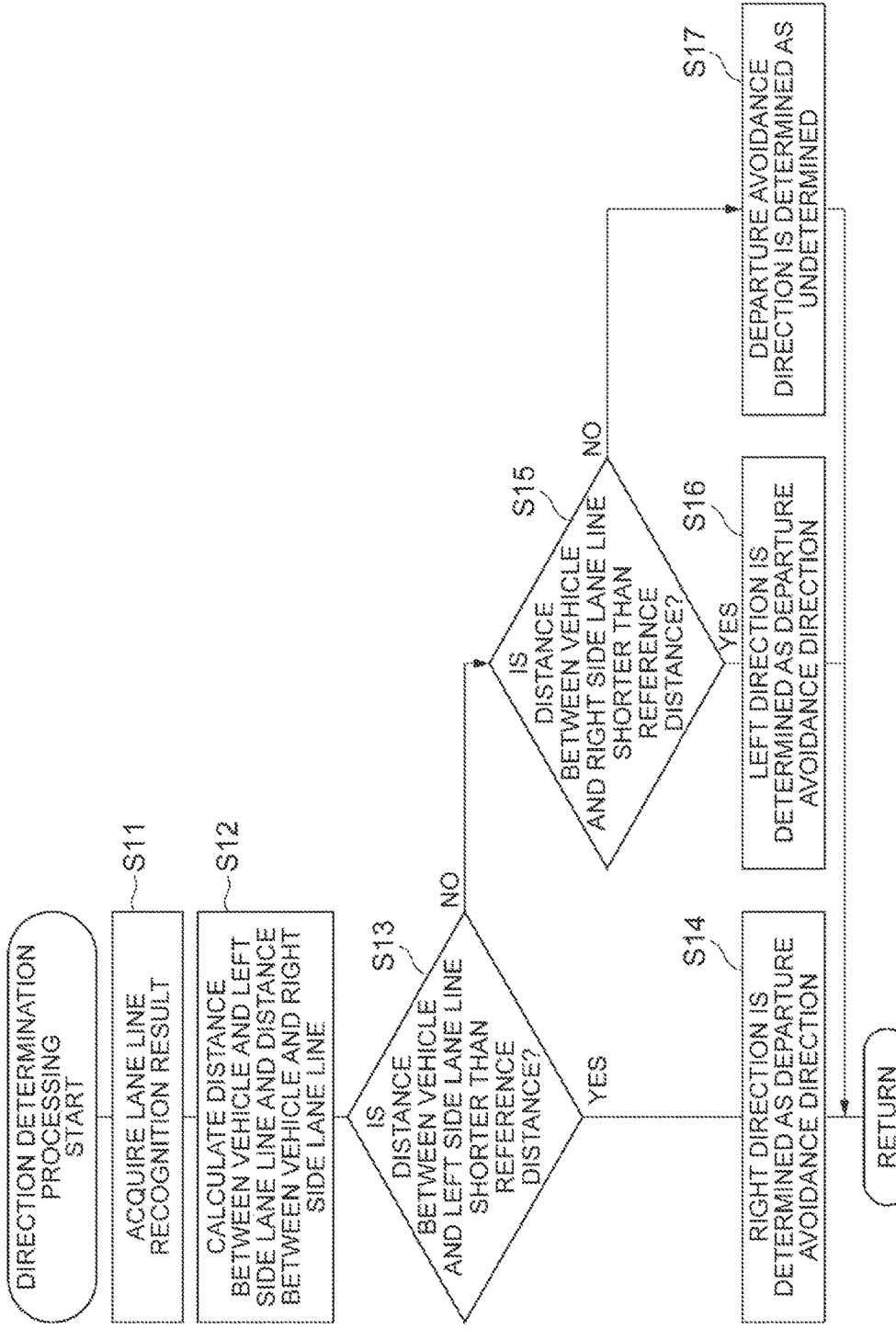

LANE DEPARTURE PREVENTION DEVICE

BACKGROUND OF THE INVENTION

Field of the Invention

The present invention relates to a lane departure prevention device.

Related Background Art

A device disclosed in Japanese Unexamined Patent Publication No. 2006-282168 is known as a technology relating to a lane departure prevention device in the related art. In the device disclosed in Japanese Unexamined Patent Publication No. 2006-282168, in a case where it is determined that a vehicle is likely to depart from a travelling lane, a braking force on each vehicle wheels of the vehicle is controlled such that a yaw moment is generated in a direction for avoiding the departure using a braking/driving force controller.

SUMMARY

In the lane departure prevention device described above, there is a possibility that an erroneous operation may occur such that the vehicle turns to the direction of departing from the travelling lane caused by malfunctioning of a random access memory (RAM) or the like. In addition, in the lane departure prevention device described above, it is desirable to provide a simple logic control system in order to decrease a calculation load.

An object of the present invention is to provide a lane departure prevention device having a fail-safe function with simple logic and capable of preventing an erroneous operation.

A lane departure prevention device in an aspect of the present invention includes: a travelling state recognition unit configured to recognize a travelling state of a vehicle based on results of detection by an external sensor and an internal sensor of the vehicle; a lane line recognition unit configured to recognize lane lines of a travelling lane in which the vehicle travels based on the result of detection by the external sensor of the vehicle; a departure determination unit configured to determine whether or not the vehicle departs from the travelling lane based on the travelling state and the lane lines; a yaw moment calculation unit configured to calculate a target trajectory based on the travelling state and the lane lines and calculate a target yaw moment which is a yaw moment causing the vehicle to travel along the target trajectory in a case where the departure determination unit determines that the vehicle departs from the travelling lane; a direction determination unit configured to determine whether a departure avoidance direction which is a direction for the vehicle to approach the center of the travelling lane in a vehicle width direction is the left direction or the right direction based on a distance between the vehicle and the lane line; a direction alignment determination unit configured to determine whether or not a turning direction of the vehicle by the target yaw moment in the vehicle width direction coincides with the departure avoidance direction; and a braking force control unit configured to control the braking forces to the right and left wheels of the vehicle based on the target yaw moment and the results of determination by the direction alignment determination unit. The braking force control unit is configured to perform a braking force control to make a difference in the braking forces to the right and left wheels of the vehicle such that the target yaw moment is generated, in a case where the direction alignment determination unit determines that the results of determinations coincide with each other, and not to perform the braking force control, in a case where the direction alignment determination unit does not determine that the results of determinations coincide with each other.

In the lane departure prevention device, the departure avoidance direction is determined based on the distance between the vehicle and the lane line, and thus, it is possible to determine the departure avoidance direction with a simple logic. In a case where the turning direction of the vehicle by the target yaw moment coincides with the departure avoidance direction, the target yaw moment is regarded as correct, and then, the braking force control is performed. On the other hand, in a case of non-coincidence, the target yaw moment is regarded as having an error, and then, the braking force control is not performed. Therefore, according to the lane departure prevention device, the fail-safe function can be provided with simple logic, and thus, it is possible to prevent the erroneous operations.

In the lane departure prevention device in the present invention, the direction determination unit may be configured to calculate a distance between the vehicle and the left side lane line and a distance between the vehicle and the right side lane line from a lateral position and a lane line position of the vehicle, to determine that the departure avoidance direction is the right direction in a case where the distance between the vehicle and the left side lane line is equal to or shorter than a predetermined reference distance, and to determine that the departure avoidance direction is the left direction in a case where the distance between the vehicle and the right side lane line is equal to or shorter than the reference distance.

In the lane departure prevention device in the present invention, the direction determination unit may be configured to determine that the departure avoidance direction is the right direction, in a case where the left side lane line is reflected on an image captured by a camera, and to determine that the departure avoidance direction is the left direction, in a case where the right side lane line is reflected on the image captured by the camera.

In the lane departure prevention device in the present invention, the direction determination unit may be configured to determine that the departure avoidance direction is the right direction, in a case where a direction of a lateral speed of the vehicle is the left direction, and to determine that the departure avoidance direction is the left direction, in a case where a direction of the lateral speed of the vehicle is the right direction.

In the lane departure prevention device in the present invention, when the result of determination by the direction alignment determination unit continues to be coincident with each other for a predetermined number of times consecutively, the braking force control unit may be configured to perform the braking force control.

The lane departure prevention device in the present invention may further include: a warning determination unit configured to determine whether or not to perform warning based on whether or not an estimated departure time which is time until the vehicle departs from the lane is equal to or smaller than a warning execution threshold value, in a case where the departure determination unit determines that the vehicle departs from the lane; and an HMI or a stimulus imparting device configured to output the warning in a case where it is determined by the warning determination unit to perform the warning.

According to the present invention, it is possible to provide a lane departure prevention device having a fail-safe function with simple logic and capable of controlling an erroneous operation.

BRIEF DESCRIPTION OF THE DRAWINGS

FIG. 4 is a flowchart illustrating direction determination processing in the lane departure prevention device in the embodiment.

DESCRIPTION OF THE PREFERRED EMBODIMENTS

Hereinafter, an embodiment will be described with reference to the drawings. In the description below, the same reference signs will be given to the same or similar elements and the description thereof will be omitted.

Figure 1:
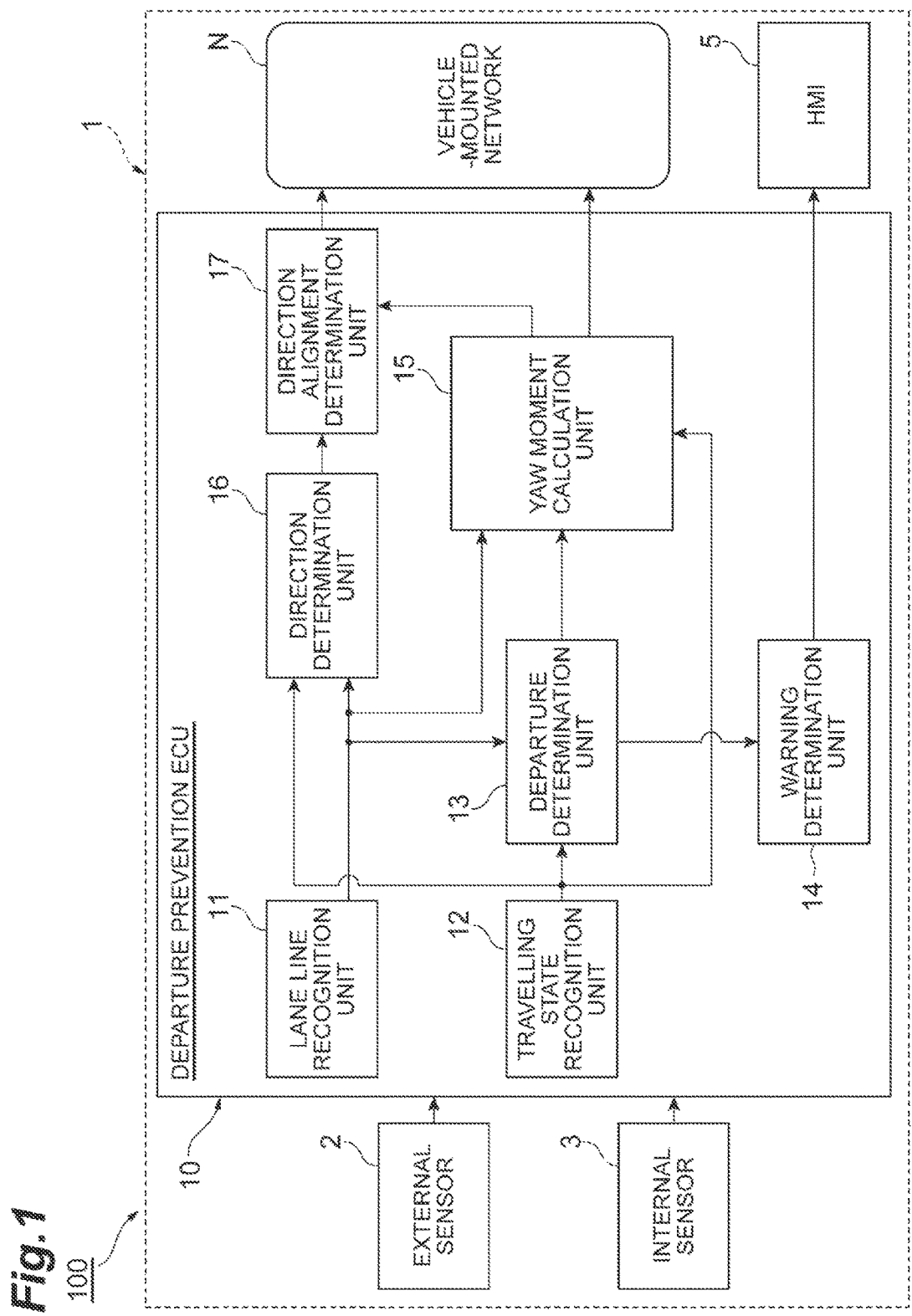
FIG. 1 is a block diagram illustrating a configuration of a lane departure prevention device in an embodiment.
Figure 2:
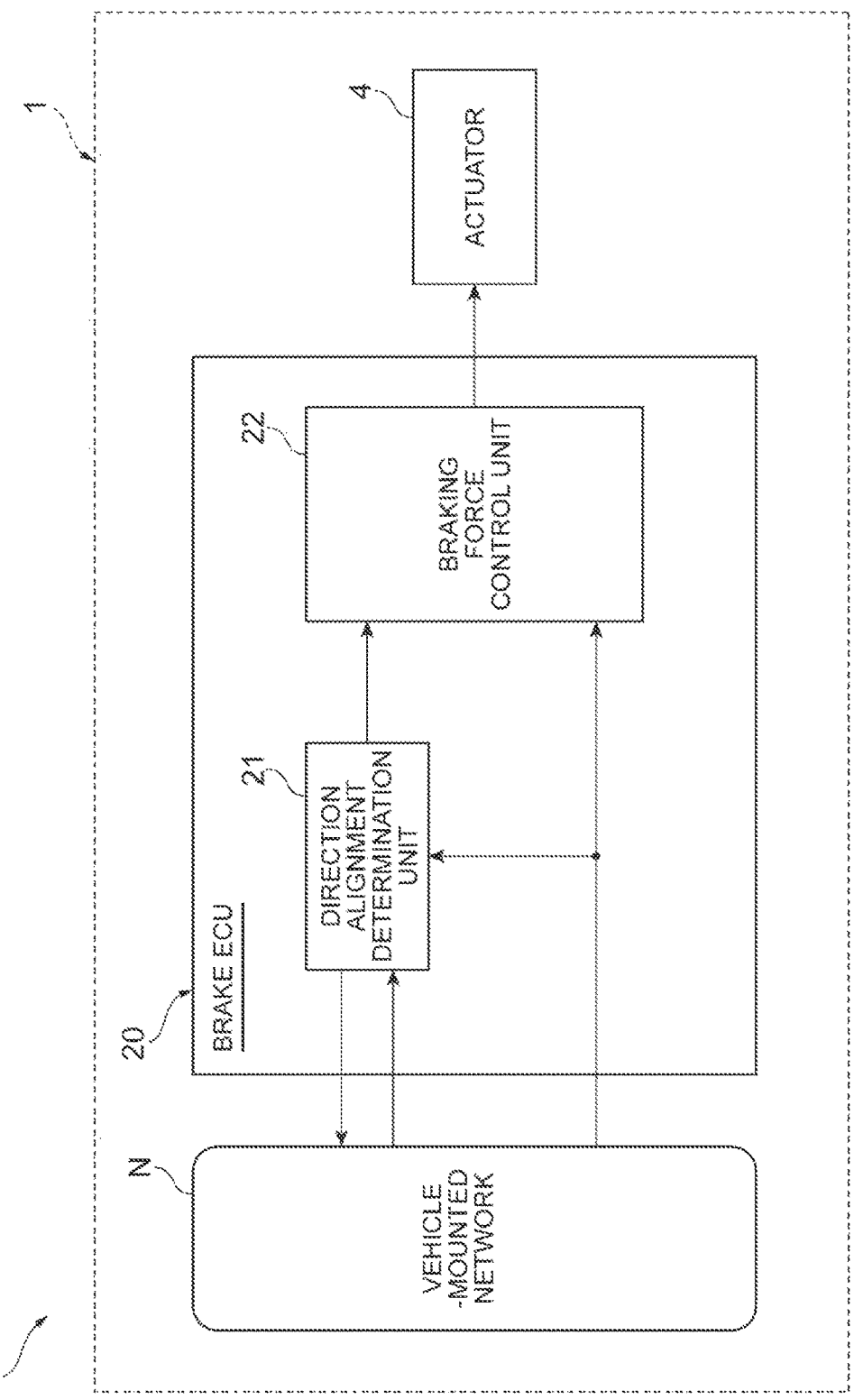
FIG. 2 is another block diagram illustrating a configuration of the lane departure prevention device in the embodiment.

FIG. 1 and FIG. 2 are block diagrams illustrating the configuration of a lane departure prevention device 100 in the embodiment. As illustrated in FIG. 1 and FIG. 2, the lane departure prevention device 100 is mounted on a vehicle 1 such as an automobile. The lane departure prevention device 100 includes an external sensor 2, an internal sensor 3, a departure prevention electronic control unit (ECU) 10, a brake ECU 20, and a brake actuator 4.

The external sensor 2 is a detection device that detects an external situation of the vehicle 1. The external sensor 2 includes at least one of a camera, a radar, and a laser imaging detection and ranging (LIDAR).

The camera is an imaging device that images the external situation of the vehicle 1. The camera may be a monocular camera or may be a stereo camera. The stereo camera has two imaging units that are arranged so as to reproduce a binocular parallax. The radar is a detection device that detects an external situation around the vehicle 1 using an electromagnetic wave (for example, a millimeter wave). The LIDAR is a detection device that detects an external situation around the vehicle 1 using the light. The camera, the radar, and the LIDAR are not necessarily prepared in duplicate. The external sensor 2 transmits detected information to the departure prevention ECU 10.

The internal sensor 3 includes at least one of a vehicle speed sensor, an accelerator sensor, and a yaw rate sensor. The vehicle speed sensor is a detection device that detects a speed of the vehicle 1. As the vehicle speed sensor, for example, a wheel speed sensor that detects rotational speeds of the vehicle wheels can be used. The accelerator sensor is a detection device that detects an acceleration of the vehicle 1. The accelerator sensor includes, for example, a longitudinal accelerator sensor that detects acceleration in the longitudinal direction of the vehicle 1 and a lateral acceleration that detects a lateral acceleration in the lateral direction of the vehicle 1. The yaw rate sensor is a detection device that detects a yaw rate (rotation angular velocity) around the vertical axis at the center of gravity of the vehicle 1. As the yaw rate sensor, for example, a Gyro sensor can be used.

The internal sensor 3 includes at least one of a steering sensor, an accelerator sensor, a brake sensor, and a blinker sensor. The steering sensor detects a driver's steering operation. The accelerator sensor detects a driver's accelerator operation. The brake sensor detects a driver's brake operation. The blinker sensor detects a driver's blinker (side turn signal lamp) operation. Various known sensors can be used as the steering sensor, the accelerator sensor, the brake sensor, and the blinker sensor respectively, but not particularly limited thereto. The steering sensor, the accelerator sensor, the brake sensor, and the blinker sensor are not necessarily prepared in duplicate. The internal sensor 3 transmits the detected information to the departure prevention ECU 10.

The departure prevention ECU 10 and the brake ECU 20 are electronic control unit including a central processing unit (CPU), read only memory (ROM), and RAM. The departure prevention ECU 10 and the brake ECU 20 are computers including processors and storage devices (memories or the like). The departure prevention ECU 10 and the brake ECU 20 perform various controls by a program stored in the ROM being loaded on the RAM and the CPU executing the program. The departure prevention ECU 10 and the brake ECU 20 may be configured to include a plurality of electronic control units.

The departure prevention ECU 10 performs various calculations for preventing the vehicle 1 from departing from the travelling lane. The departure prevention ECU 10 includes a lane line recognition unit 11, a travelling state recognition unit 12, a departure determination unit 13, a warning determination unit 14, a yaw moment calculation unit 15, a direction determination unit 16, and a direction alignment determination unit 17.

The lane line recognition unit 11 recognizes lane lines of the travelling lane based on the result of detection by the external sensor 2. The travelling lane is a lane in which the vehicle 1 travels. The lane line is a lane marker, which is a line with a road stud, paint, a stone or the like drawn on the road surface of the road. The lane line is at least any one of a lane boundary line, a vehicle traffic zone boundary line or a center line. The lane line includes at least any one of a left side lane line positioned at the left side of the travelling lane or a right side lane line positioned at the right side of the travelling lane. In the description below, the left side lane line and/or the right side lane line are simply referred to as a lane line.

Specifically, the lane line recognition unit 11 recognizes lane lines based on the image captured by the camera using a known image processing method. In a case where the radar or the LIDAR detects the electromagnetic wave reflected from the road surface, the lane line recognition unit 11 may recognize the lane line based on obstacle information of the radar or the LIDAR using the known image processing method. The lane line recognition unit 11 outputs a lane line recognition result which is a result of recognition of the lane line to the departure determination unit 13 and the yaw moment calculation unit 15. In addition, the lane line recognition unit 11 stores the lane line recognition result in a database in the departure prevention ECU 10. The lane line recognition result includes lane line information such as a lane line position and a lane line width.

The travelling state recognition unit 12 recognizes a travelling state of the vehicle 1 based on the result of detection by the external sensor 2 and the internal sensor 3. Specifically, the travelling state recognition unit 12 recognizes the vehicle speed of the vehicle 1 based on the result of detection by the vehicle speed sensor. The travelling state recognition unit 12 recognizes the lateral acceleration of the vehicle 1 based on the result of detection by the accelerator sensor. The travelling state recognition unit 12 recognizes a steering angle of the vehicle 1 based on the result of detection by the steering sensor. The travelling state recognition unit 12 recognizes a turning radius of the vehicle 1 based on vehicle body information such as the steering angle and a wheelbase of the vehicle 1. The travelling state recognition unit 12 recognizes the yaw rate of the vehicle 1 based on the result of detection by the yaw rate sensor.

The travelling state recognition unit 12 recognizes the lateral position of the vehicle 1 based on the image captured by the camera. The lateral position is position of the vehicle 1 in the vehicle width direction. The vehicle width direction (lateral direction) is a direction perpendicular to the extending direction of the travelling lane. The position of the vehicle 1 is, for example, a center of gravity position of the vehicle 1. The travelling state recognition unit 12 recognizes the lateral speed of the vehicle 1 based on image captured by the camera. The lateral speed is a speed of the vehicle 1 in the vehicle width direction. The lateral speed may be acquired as an amount of changes of the lateral position per a unit time. The travelling state recognition unit 12 recognizes the blinker operation of the vehicle 1 based on the result of detection by the blinker sensor. The travelling state recognition unit 12 outputs the recognition result of the travelling state of the vehicle 1 to the departure determination unit 13, the yaw moment calculation unit 15, and the direction determination unit 16.

The departure determination unit 13 determines whether or not the vehicle 1 departs from the travelling lane based on the lane lines recognized by the lane line recognition unit 11 and the travelling states recognized by the travelling state recognition unit 12. Hereinafter, the fact that the vehicle 1 departs from the travelling lane is simply referred to as "departure from the lane". The departure determination unit 13 estimates an estimated departure time which is a time for the vehicle 1 to depart from the lane based on at least any of the lane line position, the vehicle speed, the yaw rate, the lateral position, and the lateral speed of the vehicle 1. In a case where the estimated departure time is within a preset time, the departure determination unit 13 determines that the vehicle 1 departs from the lane.

Specifically, the departure determination unit 13 calculates a lane line width Lw from the left side lane line position and the right side lane line position. The departure determination unit 13 calculates an estimated departure time T from the lane line width Lw, a lateral position X of the vehicle 1, and the lateral speed Vx according to an Equation described below. The lateral position is a position with the center of the travelling lane in the vehicle width direction as zero. In a case where a navigation system is mounted on the vehicle 1, the lane line width Lw can also be calculated based on map information from the navigation system. In a case where a communication device is mounted on the vehicle 1, the lane line width Lw can also be calculated based on communication information by a vehicle-to-vehicle communication or a road-to-vehicle communication.

$$\text{Estimated Departure Time } T=(Lw/2-X)/Vx$$

In a case where the calculated estimated departure time T is equal to or shorter than the preset time, the departure determination unit 13 determines that the vehicle 1 departs from the lane. The preset time may be set in advance and may be stored in the departure prevention ECU 10. The preset time may be a constant value or may be a variable value that varies according to the vehicle speed, the yaw rate, or the steering angle of the vehicle 1.

In a case where the blinker operation of the vehicle 1 is performed, the departure determination unit 13 does not determine that the vehicle 1 departs from lane because it is regarded that the vehicle 1 intentionally changes the lane. If the steering angle and the amount of changes of the steering angle of the vehicle 1 are equal to or greater than a certain value, the departure determination unit 13 does not determine that the vehicle 1 departs from the lane because it is regarded that the vehicle 1 intentionally changes the lane. The departure determination unit 13 calculates a departure angle which is an angle of the vehicle 1 to the lane line based on the lane line and the steering angle of the vehicle 1, and in a case where the departure angle is greater than a reference departure angle set in advance, the departure determination unit 13 does not determine that the vehicle 1 departs from the lane because it is regarded that the vehicle 1 intentionally changes the lane. That is, the departure determination unit 13 performs a straight travel determination based on the travelling state of the vehicle 1 whether or not the vehicle 1 straightly travels along the travelling lane, and in a case where it is determined that the vehicle does not travel straightly, the departure determination unit 13 does not determines that the vehicle 1 departs from the lane because it is regarded that the vehicle 1 intentionally changes the lane.

The departure determination by the departure determination unit 13 does not mean the determination whether or not the vehicle 1 is currently departing from the lane (whether or not the vehicle 1 has already departed from the lane), but means the determination whether or not the vehicle 1 will depart from the lane in the near future (whether the possibility of the departure from the lane is high or not). Other various known methods can be used for the departure determination by the departure determination unit 13.

The warning determination unit 14 performs a warning determination whether or not to perform a warning against the lane departure. In a case where the warning determination unit 14 determines to perform the warning, the human machine interface (HMI) 5 is caused to output the warning. For example, in a case where the estimated departure time T calculated by the departure determination unit 13 becomes equal to or smaller than a warning execution threshold value, the warning determination unit 14 outputs a control signal to the HMI 5 to execute the warning. The warning execution threshold value may be set in advance and may be stored in the departure prevention ECU 10. The warning execution threshold value may be a constant value or may be a variable value that varies according to the vehicle speed, the yaw rate, and the steering angle of the vehicle 1. The HMI 5 is an interface that performs inputting and outputting of information between the device and the occupants (including the driver) of the vehicle 1. The HMI 5 includes a display panel for displaying the image information and a speaker for outputting the voice. The HMI 5 outputs a buzzer sound and display instruction as the warning according to the control signal input from the warning determination unit 14.

The warning determination unit 14 may output the control signal to execute the warning to a stimulus imparting device that imparts haptic simulations such as force and vibration to the driver. The stimulus imparting device imparts the haptic stimulus to the driver as the warning according to the control signal input from the warning determination unit 14.

In a case where it is determined by the departure determination unit 13 that the vehicle 1 departs from the travelling lane, the yaw moment calculation unit 15 calculates a target trajectory based on the travelling state and the lane line, and calculates a target yaw moment which is a yaw moment causing the vehicle 1 to travel along the target trajectory. The yaw moment calculation unit 15 outputs the calculated target yaw moment to the direction alignment determination unit 17 and a vehicle-mounted network N. The vehicle-mounted network N is, for example, a controller area network (CAN).

As an example, under the constraints that the lateral speed and/or the lateral acceleration are equal to or lower than certain values respectively, the yaw moment calculation unit 15 calculates a target trajectory OT from an integral value of a yaw angle θ that causes the vehicle 1 to travel along the travelling lane (that is, causes the vehicle 1 to smoothly travel along the travelling lane). For example, the yaw moment calculation unit 15 calculates the target trajectory OT according to an Equation below. Travelling lane information can be acquired based on at least any of the image captured by the camera and the recognized lane line. In a case where a navigation system is mounted on the vehicle 1, the travelling lane information can be acquired based on the nap information in the navigation system. In a case where a communication device is mounted on the vehicle 1, the travelling lane information can be acquired based on the communication information by the vehicle-to-vehicle communication or road-to-vehicle communication.

Target Trajectory $OT=\int d\theta/dt$

The yaw moment calculation unit 15 calculates a target yaw moment Ms for achieving the target trajectory using an inverse model of the vehicle. For example, the yaw moment calculation unit 15 calculates the target yaw moment based on the target trajectory using a general rotational motion equation as illustrated below. 1 in the equation below is a moment of inertia of the vehicle 1. The moment of inertia I may be set in advance and stored in the departure prevention ECU 10.

Target Yaw Moment $Ms=I\cdot(d^2\theta/dt^2)$

When calculating the target yaw moment Ms or the like, a gain corresponding to the travelling state such as the vehicle speed of the vehicle 1 may be taken into consideration. The yaw moment calculation unit 15 can also obtain the target yaw rate from the calculated target trajectory and calculate the yaw moment realizing the target yaw rate as the target yaw moment Ms. The method of calculating the target yaw moment Ms is not particularly limited, and various known methods can be used.

The direction determination unit 16 determines whether a departure avoidance direction which is a direction for the vehicle 1 to approach the center of the travelling lane in the vehicle width direction is the left direction or the right direction. The direction determination unit 16 outputs the result of determination of the departure avoidance direction to the direction alignment determination unit 17 and the vehicle-mounted network N. The left direction is a left direction in the vehicle width direction. The right direction is a right direction in the vehicle width direction (hereinafter, the same). The departure avoidance direction is a vehicle width direction for causing the vehicle 1 to be deflected in order to avoid the departure from the lane. The departure avoidance direction is a direction opposite to a side approaching the lane line in the vehicle width direction. The departure avoidance direction corresponds to a direction to turn the vehicle 1 for avoiding the departure from the lane.

The direction determination unit 16 determines the departure avoidance direction based on a distance between the vehicle 1 and the lane line. Specifically, the direction determination unit 16 detects the lane line position using the lane line recognition result recognized by the lane line recognition unit 11 and stored in the database. The direction determination unit 16 calculates the distance between the vehicle 1 and the left side lane line and the distance between the vehicle 1 and the right side lane line from the lateral position of the vehicle 1 recognized by the travelling state recognition unit 12 and the lane line position in the lane line recognition result. The distances are intervals between the vehicle 1 and the lane lines in the vehicle width direction. In the distances, the center of gravity position of the vehicle 1 may be used as a reference, end portions of the vehicle body of the vehicle 1 in the vehicle width direction may be used as the reference, the center of the lane lines in the vehicle width direction may be used as the reference, or the end portions of the lane lines in the vehicle width direction may be used as the reference.

In a case where the distance between the vehicle 1 and the left side lane line is equal to or smaller than a reference distance Ln, the direction determination unit 16 determines that the departure avoidance direction is the right direction. In a case where the distance between the vehicle 1 and the right side lane line is equal to or smaller than a reference distance Ln, the direction determination unit 16 determines that the departure avoidance direction is the left direction. In a case where both the distance between the vehicle 1 and the left side lane line and the distance between the vehicle 1 and the right side lane line are greater than the reference distance Ln, the direction determination unit 16 can determine that the possibility of lane departure is low, and thus, the departure avoidance direction is determined as "undetermined".

The reference distance Ln is a threshold value set in advance for determining the departure avoidance direction. The reference distance Ln may be stored in the departure prevention ECU 10. The reference distance Ln can be expressed as below described equation based on, for example, a lane line width Lw and a vehicle body width Lv. a and b in the equation below are values set in advance through design, experiment or experience. The reference distance Ln may be a constant value or may be a variable value. The direction determination unit 16 may detect the lane line position directly using the lane line recognition result recognized by the lane line recognition unit 11 instead of the lane line recognition result stored in the database.

Reference Distance $Ln=(Lw-Lv)\times a/2+b$

The direction alignment determination unit 17 performs processing similar to the processing (details will be described below) by a direction alignment determination unit 21 of the brake ECU 20. The direction alignment determination unit 17 is a functional block for monitoring whether or not the determination processing by the direction alignment determination unit 21 of the brake ECU 20 is normal, and the result of determination by the direction alignment determination unit 17 is used for a comparison with the result of determination by the direction alignment determination unit 21 of the brake ECU 20. The direction alignment determination unit 17 outputs the result of determination to the vehicle-mounted network N.

The brake ECU 20 controls the operation of the brake actuator 4. The brake ECU 20 includes the direction alignment determination unit 21 and a braking force control unit 22.

The direction alignment determination unit 21 determines whether or not the turning direction of the vehicle 1 by the target yaw moment Ms in the vehicle width direction coincides with the departure avoidance direction. Turning means the turning of the vehicle 1 such that the direction of the vehicle 1 changes. In a case where the vehicle 1 turns so as to face the left side by the target yaw moment Ms input via the vehicle-mounted network N, the direction alignment determination unit 21 defines the turning direction of the vehicle 1 as the left direction. In a case where the vehicle 1 turns so as to face the right side by the target yaw moment Ms input via the vehicle-mounted network N, the direction alignment determination unit 21 defines the turning direction of the vehicle 1 as the right direction. Then, the direction alignment determination unit 21 determines whether or not the turning direction coincides with the departure avoidance direction input via the vehicle-mounted network N (whether or not the alignment has been achieved).

The direction alignment determination unit 21 outputs the result of determination to the braking force control unit 22. In addition, the direction alignment determination unit 21 outputs the result of determination to the vehicle-mounted network N in order to monitor whether or not the determination processing by the direction alignment determination unit 21 is normal. In the processing, the turning direction and the departure avoidance direction of the vehicle 1 may be treated as a flag, ON and/or OFF, a positive or negative sign. For example, regarding the turning direction and the departure avoidance direction of the vehicle 1, a right direction flag and a left direction flag may be expressed as an ON and/or OFF respectively. The sign may be positive in a case of the right direction and the sign may be negative in a case of the left direction.

The lane departure prevention device 100 includes a monitor device (not illustrated) that monitors the result of determination by the direction alignment determination unit 21 of the brake ECU 20. The monitor device is connected to the vehicle-mounted network N, and the result of determination by the direction alignment determination unit 17 of the departure prevention ECU 10 and the result of determination by the direction alignment determination unit 21 of the brake ECU 20 are input to the monitor device via the vehicle-mounted network N. The monitor device compares the result of determination by the direction alignment determination unit 21 and the result of determination by the direction alignment determination unit 17, and determines whether or not the results of determinations coincide with each other. In a case where the results of determinations coincide with each other, the monitor device determines that the direction alignment determination unit 21 is normal, and on the other hand, in a case where the results of determinations do not coincide with each other, the monitor device determines that the direction alignment determination unit 21 is abnormal.

The braking force control unit 22 controls the braking force to the right and left wheels of the vehicle 1 based on the target yaw moment Ms input via the vehicle-mounted network N and the result of determination by the direction alignment determination unit 21. In a case where the direction alignment determination unit 21 determines that the results of determinations coincide with each other, the braking force control unit 22 performs the braking force control to make a difference in the braking forces to the right and left vehicle wheels (the right side vehicle wheels and the left side vehicle wheels) of the vehicle 1 such that the target yaw moment Ms is generated. In a case where the direction alignment determination unit 21 determines that the results of determinations do not coincide with each other, the braking force control unit 22 does not perform the braking force control.

Specifically, in a case of performing the braking force control, the braking force control unit 22 calculates the braking forces to the right and left vehicle wheels having the difference in braking force which can generate the target yaw moment Ms using a known method. As long as the braking forces to the right and left wheels have the difference in braking force, one of the braking forces among the braking forces to the right and left wheels may be zero, or both of the braking forces may be zero. The calculated braking forces to the right and left wheels are converted to brake hydraulic pressures on the right and left wheels of the vehicle 1 using a known method. On the other hand, in a case of not performing the braking force control, the braking force control unit 22 sets the operation flag as OFF and sets the brake hydraulic pressures on the right and left wheels of the vehicle 1 as the normal value. The braking force control unit 22 outputs a control signal to operate the brake system at the brake hydraulic pressures to the brake actuator 4. The brake operation detected by the brake sensor is taken into consideration for the brake hydraulic pressures.

The brake actuator 4 is device for controlling the braking force of the vehicle 1. The brake actuator 4 controls the brake system in response to the control signal from the braking force control unit 22 of the brake ECU 20, and controls the braking forces given to the right and left wheels of the vehicle 1. A hydraulic brake system can be used as the brake system.

Next, an example of the lane departure prevention processing and the direction determination processing performed by the lane departure prevention device 100 will be described in detail with reference to flowcharts in FIG. 3 and FIG. 4.

Figure 3:
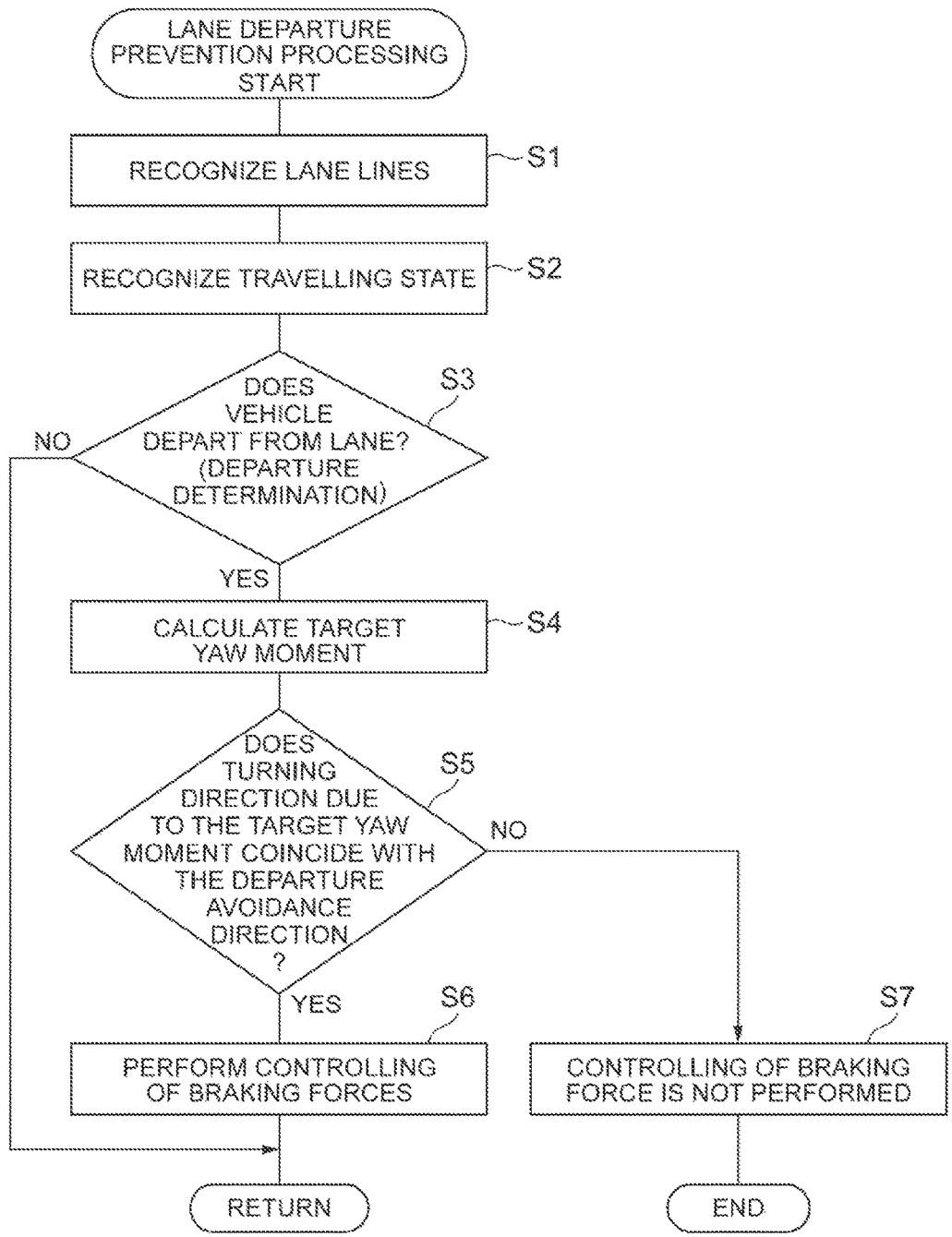
FIG. 3 is a flowchart illustrating lane departure prevention processing in the lane departure prevention device in the embodiment.

FIG. 3 is a flowchart illustrating the lane departure prevention processing. As illustrated in FIG. 3, in the lane departure prevention device 100, the lane departure prevention processing described below is performed in the departure prevention ECU 10 and the brake ECU 20.

First, the lane line recognition unit 11 recognizes the lane lines of the travelling lane based on the result of detection by the external sensor 2 (STEP S1). In STEP S1 described above, the lane line recognition result recognized by the lane line recognition unit 11 is stored in the database of the departure prevention ECU 10 in order to be used in the below-described direction determination processing (refer to FIG. 4). The travelling state recognition unit 12 recognizes the travelling state of the vehicle 1 based on the result of detections by the external sensor 2 and the internal sensor 3 (STEP S2). The departure determination unit 13 determines whether or not the vehicle 1 departs from the lane based on the lane lines recognized by the lane line recognition unit 11 and the travelling state recognized by the travelling state recognition unit 12 (STEP S3, the departure determination).

In a case of YES in STEP S3 described above, the yaw moment calculation unit 15 calculates the target trajectory OT based on the lane lines recognized by the lane line recognition unit 11 and the travelling state recognized by the travelling state recognition unit 12, and calculates the target yaw moment Ms (STEP S4). The direction alignment determination unit 21 determines whether or not the turning direction of the vehicle 1 due to the target yaw moment Ms coincides with the departure avoidance direction with reference to the result of determination in the direction determination processing (refer to FIG. 4) described below (STEP S5).

In a case of YES in STEP S5 described above, the braking force control unit 22 performs the braking force control to make a difference in the braking forces to the right and left wheels of the vehicle 1 such that the target yaw moment Ms is generated (STEP S6). In a case of NO in STEP S3 described above or after STEP S6 described above, the processing is returned to STEP S1 to be performed. In a case of NO in STEP S5 described above, the braking force control unit 22 does not perform the braking force control, and the process ends (STEP S7).

In the lane departure prevention processing described above, in a case where the departure determination unit 13 determines that the vehicle 1 departs from the lane (YES in STEP S3 described above), the warning determination unit 14 determines (warning determination) whether or not to perform the warning, and outputs the warning to the HMI 5 in a case where it is determined to perform the warning.

FIG. 4 is a flowchart illustrating the direction determination processing. As illustrated in FIG. 4, in the lane departure prevention device 100, the direction determination processing is performed by the direction determination unit 16 in the departure prevention ECU 10 simultaneously and in parallel to the lane departure prevention processing described above.

First, the lane line recognition result is acquired from the database in the departure prevention ECU 10 (STEP S1). The distance between the vehicle 1 and the left side lane line and the distance between the vehicle 1 and the right side lane line are calculated based on the lateral position of the vehicle 1 recognized by the travelling state recognition unit 12 and the lane line position in the lane line recognition result (STEP S12). Whether or not the distance between the vehicle 1 and the left side lane line is equal to or shorter than the reference distance Ln is determined (STEP S13).

In a case of YES in STEP S13 described above, the right direction is determined as the departure avoidance direction (STEP S14). In the processing in STEP S14 described above, for example, the determination may be handled with the right direction flag as ON and the left direction flag as OFF, or may be handled with the signs representing the departure avoidance direction as positive. In a case of NO in STEP S13 described above, whether or not the distance between the vehicle 1 and the right side lane line is equal to or shorter than the reference distance Ln is determined (STEP S15).

In a case of YES in STEP S15 described above, the left direction is determined as the departure avoidance direction (STEP S16). In the processing in STEP S16 described above, for example, the determination may be handled with the right direction flag as OFF and the left direction flag as ON, or may be handled with the signs representing the departure avoidance direction as negative. In a case of NO in STEP S15 described above, it is determined that the possibility of lane departure is low, and thus, the departure avoidance direction is determined as "undetermined" (STEP S17). In the processing in STEP S17 described above, for example, the determination may be handled with the right direction flag as OFF and the left direction flag as OFF, or may be handled without the signs representing the departure avoidance direction. After STEP S14 described above and STEP S16 or STEP S17 described above, the process returns to STEP S11 described above, and the processing items are repeated to be performed.

The lane departure prevention processing described above and the direction determination processing described above start in a case where the predetermined start condition is satisfied, for example, the case where the ignition of the vehicle 1 is turned ON. On the other hand, the lane departure prevention processing described above and the direction determination processing described above end in a case where the predetermined end condition is satisfied, for example, the case where the ignition of the vehicle 1 is turned OFF.

As described above, in the lane departure prevention device 100, the departure avoidance direction is determined based on the distance between the vehicle 1 and the lane lines, and thus, it is possible to determine the departure avoidance direction using simple logic. In a case where the turning direction of the vehicle 1 due to the target yaw moment Ms coincides with the departure avoidance direction, the target yaw moment Ms is regarded as correct, the braking force control is performed to give difference in the braking force to the right and left wheels of the vehicle 1 such that the target yaw moment Ms is generated. On the other hand, in a case of non-coincidence, the target yaw moment Ms is regarded as having an error, the braking force control is not performed.

Therefore, according to the lane departure prevention device 100, the logic for determining the turning direction of the vehicle 1 can easily be performed in dual. The fail-safe function can be provided with simple logic. It becomes possible to prevent the erroneous operations such as turning of the vehicle 1 in the direction of departing from the lanes due to the errors (for example, reversal of the calculated target yaw moment, reversal of the signs in the processing such as positive and negative, or reversal of the flags) caused by the malfunctioning of the RAM. It is possible to prevent the problems such as an increase in the calculation load and a missing in the processing which are concerned in a normal dual system. It is also possible to deal with the erroneous operation which cannot be dealt with in the dual system by a simple bit operation.

As described above, the embodiment of the present invention is described. However, the present invention can be embodied in various aspects without being limited to the embodiment described above. In the embodiment described above, a part of the functions of the departure prevention ECU 10 and the brake ECU 20 may be performed by a computer in a facility such as an information processing center which can communicate with the vehicle 1.

In the embodiment described above, in a case where the lane lines are reflected on the image captured by the camera, the direction determination unit 16 may determine the departure avoidance direction based on whether the lane line is any of the left side lane line or the right side lane line. Specifically, in a case where the left side lane line is reflected on the image captured by the camera, the direction determination unit 16 may determine that the departure avoidance direction is the right direction. In a case where the right side lane line is reflected on the image captured by the camera, the direction determination unit 16 may determine that the departure avoidance direction is the left direction.

In the embodiment described above, the direction determination unit 16 may determine the departure avoidance direction based on the direction of the lateral speed of the vehicle 1. Specifically, in a case where the direction of the lateral speed of the vehicle 1 is the left direction, the direction determination unit 16 may determine that the departure avoidance direction is the right direction. In a case where the direction of the lateral speed of the vehicle 1 is the right direction, the direction determination unit 16 may determine that the departure avoidance direction is the left direction.

In the embodiment described above, when the determination in STEP S5 is YES (when the turning direction of the vehicle 1 due to the target yaw moment Ms coincides with the departure avoidance direction), the braking force control is performed in STEP S6. However, the processing may be as follows. That is, in the lane departure prevention processing repeatedly performed as described above, until the result of determination in STEP S5 described above becomes consecutively YES for the predetermined number of times, the process may return to STEP S1 described above without performing the braking force control, and in a case where the result of determination in STEP S5 described above does not become consecutively YES for the predetermined number of times, the braking force control may be performed. In this way, it is possible to take a difference in the processing cycles between the direction determination processing described above and the lane departure prevention processing described above into consideration. It is possible to prevent the adverse influence occurring in a case where the turning direction is temporarily and erroneously determined due to the noise or the like.

In the embodiment described above, for example, in a case where the determination processing in the direction alignment determination unit 21 of the brake ECU 20 is not monitored, the direction alignment determination unit 17 of the departure prevention ECU 10 may not be included. In the configuration in the embodiment described above, the departure prevention ECU 10 and the brake ECU 20 are connected to each other via the vehicle-mounted network N. However, the departure prevention ECU 10 and the brake ECU 20 may be configured as one ECU.

In the embodiment described above, the direction determination processing is performed in parallel with the lane departure prevention processing. However, the direction determination processing described above and the lane departure prevention processing described above may be performed in one processing sequence (processing in series). For example, the direction determination processing described above may be performed after STEP S3 described above and before STEP S5 described above.

What is claimed is:

1. A lane departure prevention device comprising:
an electronic control unit including or more processors programmed to:
recognize a travelling state of a vehicle based on results of detection by an external sensor and an internal sensor of the vehicle;
recognize lane lines of a travelling lane in which the vehicle travels based on the result of detection by the external sensor;
determine whether or not the vehicle departs from the travelling lane based on the travelling state and the lane lines;
calculate a target trajectory based on the travelling state and the lane lines and calculate a target yaw moment which is a yaw moment causing the vehicle to travel along the target trajectory in a case where the vehicle departs from the travelling lane;
determine whether a departure avoidance direction which is a direction for the vehicle to approach the center of the travelling lane in a vehicle width direction is the left direction or the right direction based on a distance between the vehicle and the lane line;
determine whether or not a turning direction of the vehicle by the target yaw moment in the vehicle width direction coincides with the departure avoidance direction;
control the braking forces to the right and left wheels of the vehicle based on the target yaw moment and the results of the determination of whether or not the turning direction of the vehicle by the target yaw moment in the vehicle width direction coincides with the departure avoidance direction,
perform a braking force control to make a difference in the braking forces to the right and left wheels of the vehicle such that the target yaw moment is generated, in a case where the turning direction of the vehicle by the target yaw moment in the vehicle width direction coincides with the departure avoidance direction, and
not perform the braking force control, in a case where the turning direction of the vehicle by the target yaw moment in the vehicle width direction does not coincide with the departure avoidance direction.

2. The lane departure prevention device according to claim 1,
wherein the electronic control unit is programmed to:
calculate a distance between the vehicle and the left side lane line and a distance between the vehicle and the right side lane line from a lateral position and a lane line position of the vehicle,
determine that the departure avoidance direction is the right direction in a case where the distance between the vehicle and the left side lane line is equal to or shorter than a predetermined reference distance, and
determine that the departure avoidance direction is the left direction in a case where the distance between the vehicle and the right side lane line is equal to or shorter than the reference distance.

3. The lane departure prevention device according to claim 1,
wherein the electronic control unit is programmed to:
determine that the departure avoidance direction is the right direction, in a case where the left side lane line is reflected on an image captured by a camera, and
determine that the departure avoidance direction is the left direction, in a case where the right side lane line is reflected on the image captured by the camera.

4. The lane departure prevention device according to claim 1,
wherein the electronic control unit is programmed to:
determine that the departure avoidance direction is the right direction, in a case where a direction of a lateral speed of the vehicle is the left direction, and
determine that the departure avoidance direction is the left direction, in a case where a direction of the lateral speed of the vehicle is the right direction.

5. The lane departure prevention device according to claim 1,
wherein, when the electronic control unit determines that a turning direction of the vehicle by the target yaw moment in the vehicle width direction continues to coincide with the departure avoidance direction for a predetermined number of times consecutively, the braking force control is performed.

6. The lane departure prevention device according to claim 1, wherein the electronic control unit is further programmed to determine whether or not to perform warning based on whether or not an estimated departure time which is time until the vehicle departs from the lane is equal to or smaller than a warning execution threshold value, in a case where the vehicle departs from the lane; and
an HMI or a stimulus imparting device is configured to output the warning in a case where it is determined to perform the warning.

* * * * *